I. M. JACOBS AND W. CRAMER.
LOCK FOR MOVABLE PARTS.
APPLICATION FILED APR. 5, 1920.

1,415,354.

Patented May 9, 1922.

Inventors:
Isidor M. Jacobs,
William Cramer,
By Hugh K. Wagner,
Atty

UNITED STATES PATENT OFFICE.

ISIDOR M. JACOBS, OF KANSAS CITY, AND WILLIAM CRAMER, OF ST. LOUIS, MISSOURI, ASSIGNORS TO TRUCK, TRACTOR, AND MANUFACTURING COMPANY, OF ST. LOUIS, MISSOURI, A CORPORATION OF MISSOURI.

LOCK FOR MOVABLE PARTS.

1,415,354.        Specification of Letters Patent.     Patented May 9, 1922.

Application filed April 5, 1920. Serial No. 371,455.

*To all whom it may concern:*

Be it known that we, ISIDOR M. JACOBS and WILLIAM CRAMER, citizens of the United States, residing, respectively, at the city of Kansas City, county of Jackson, State of Missouri, and at the city of St. Louis, in the State of Missouri, have invented certain new and useful Improvements in Locks for Movable Parts, of which the following is a specification.

This invention is a lock. It is especially suitable for locking tubular members together. The word tubular is thus used in a very general sense, including angular members, box-like members, and various forms. This lock is adapted for use in a variety of constructions and is especially intended for use in any place where quick unlocking and rapid locking is desirable, as, for instance, in locations where a quick change of parts is desirable—for example, in the construction shown and described in the Patent 1,273,613 of the same inventors, dated July 23, 1918.

In the accompanying drawings forming part of this specification, in which like numbers of reference denote like parts wherever they occur, Figure 1 is a sectional view of the power-transformer of Patent 1,273,613 and shows in elevation this lock applied to the universal joint of the said device;

Figure 1:
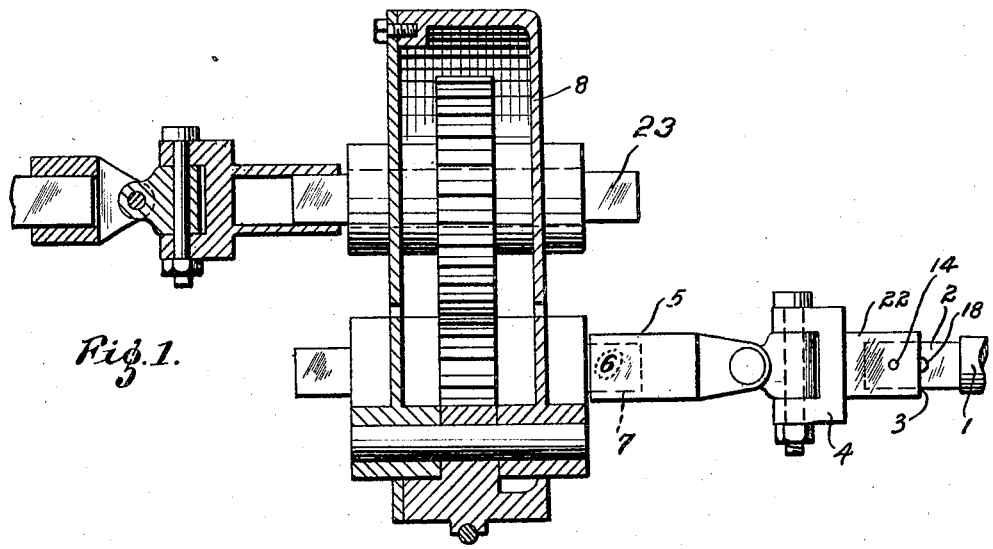

The shaft 1 comes from the engine or elsewhere and has the polygonal end 2 adapted to fit within the polygonal cup 3 on one side of universal joint 4. The other side 5 of universal joint 4 contains a cup 6, which is adapted to receive polygonal end 7 of a stub or shaft projecting from power-transformer 8. This application of this device is only illustrative, as the same may be used in numerous places more or less varying in kind.

The squared end 2 contains a bore 9 or other socket in which is contained spring 10, held in place after insertion of transverse pin 11, which passes through bore 12 or other opening, its ends being peened or upset as at 13.

Figure 2:
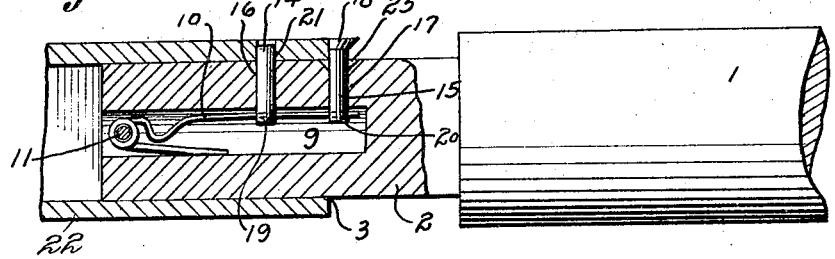
Figure 2 is a longitudinal sectional view showing the locked position.

A dog 14 and dog or plunger 15 are located in bores 16 and 17 or other openings in end 2. Pressure upon head 18 forces the long arm of spring 10 away from contact with the interior wall of bore 9. As the said long arm of spring 10 passes through piercings 19 and 20 in dog 14 and dog or plunger 15, respectively, the said pressure upon head 18 moves dog 14 out of opening 21 and allows longitudinal movement of cup 3 relative to end 2 in either direction, either for immediate removal of end 22 containing cup 3 from end 2 or for movement in the space on end 2, shown in Figures 1 and 2, between the end of shaft 1 and the extremity of end 22, whereby the universal joint 4 can be slipped off the end of stub 7 for attachment, for example, to the stub or end 23.

Figure 3:
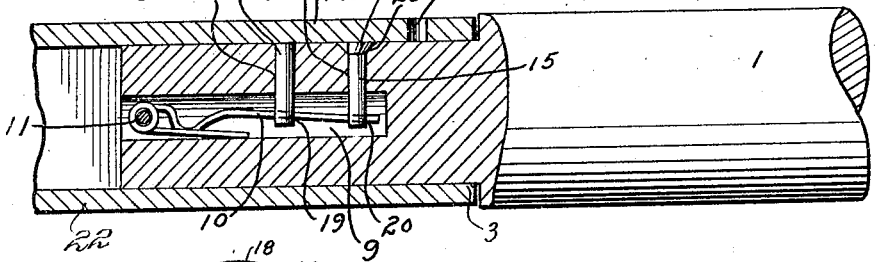
Figure 3 is a longitudinal sectional view showing the parts while in movement toward or from locked position.
Figure 4:
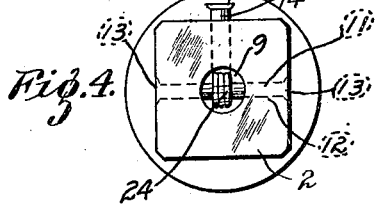
Figure 4 is a detail, taken transversely relative to the view in Figures 2 and 3, showing the means of holding the spring in position.

Figure 3 shows end 22 thus slid toward the end of shaft 1 with the dog 14 and dog or plunger 15 and the spring 10 depressed. This position either allows the withdrawal of end 2 or shaft 1 rapidly out of cup 3 or provides play whereby end 5 of universal joint 4 can be withdrawn from stub 7 for any purpose, such, for instance, as being placed upon stub 23.

The twist 24 of spring 10 forms a convenient means for attachment, as, for instance, to pin 11 for holding the same in bore 9.

The head 18 is adapted to fit into countersink 25, as shown in Figure 3, so that further depression of dog 14 or of plunger 15 is limited.

The above-described lock is simple, cheap, durable, efficient, and easy and quick to operate.

Having thus described this invention, we hereby reserve the benefit of all changes in form, arrangement, order, or use of parts, as it is evident that many minor changes may be made therein without departing from the spirit of this invention or the scope of the following claims.

We claim:

1. The combination of hollow members telescoping each other, the inner one being provided with a longitudinal bore and a lateral bore communicating with the longitudinal bore, a spring located in one of the said bores, a dog slidable in the remaining bore actuated by the said spring and adapted to lock the said members together, and another dog adapted to actuate the said spring for releasing the said first-mentioned dog.

2. In a device of the character described, the combination of telescoping members, each of which is pierced with a bore, and a dog slidable in the said bore in one of the said members and adapted to enter or to be ejected from the said bore in the said other member and a spring adapted by spring-pressure to cause the said entrance into the said bore and by its use as a lever to cause its ejection.

3. In a device of the character described, the combination of telescoping members, each of which is pierced with a lateral bore, and a dog guided for sliding movement in the said bore in one of the said members and adapted to enter or to be ejected from the said bore in the said other member and a spring adapted by spring-pressure to cause the said entrance into the said bore and by its use as a lever to cause its ejection, one of the said members being provided with an additional bore and a plunger operatable therein in conjunction with the said spring.

4. In a device of the character described, the combination of telescoping members, each of which is pierced with a bore, and a dog located in the said bore in one of the said members and adapted to enter or to be ejected from the said bore in the said other member and a spring adapted by spring-pressure to cause the said entrance into the said bore and by its use as a lever to cause its ejection, one of the said members being provided with an additional bore and a plunger operatable therein in conjunction with the said spring, there being another bore in one of the said members at approximately a right angle to the said other bores and containing the said spring.

5. In a device of the character described, the combination of telescoping members, each of which is pierced with a bore, and a dog located in the said bore in one of the said members and adapted to enter or to be ejected from the said bore in the said other member, a spring adapted by spring-pressure to cause the said entrance into the said bore and by its use as a lever to cause its ejection, one of the said members being provided with an additional bore and a plunger operatable therein in conjunction with the said spring, there being another bore in one of the said members at approximately a right angle to the said other bores and containing the said spring, the said spring being twisted, and there being a pin located transversely of the said last-mentioned bore and passing through the said twist in the said spring.

In testimony whereof we hereunto affix our signatures.

ISIDOR M. JACOBS.
WILLIAM CRAMER.